UNITED STATES PATENT OFFICE.

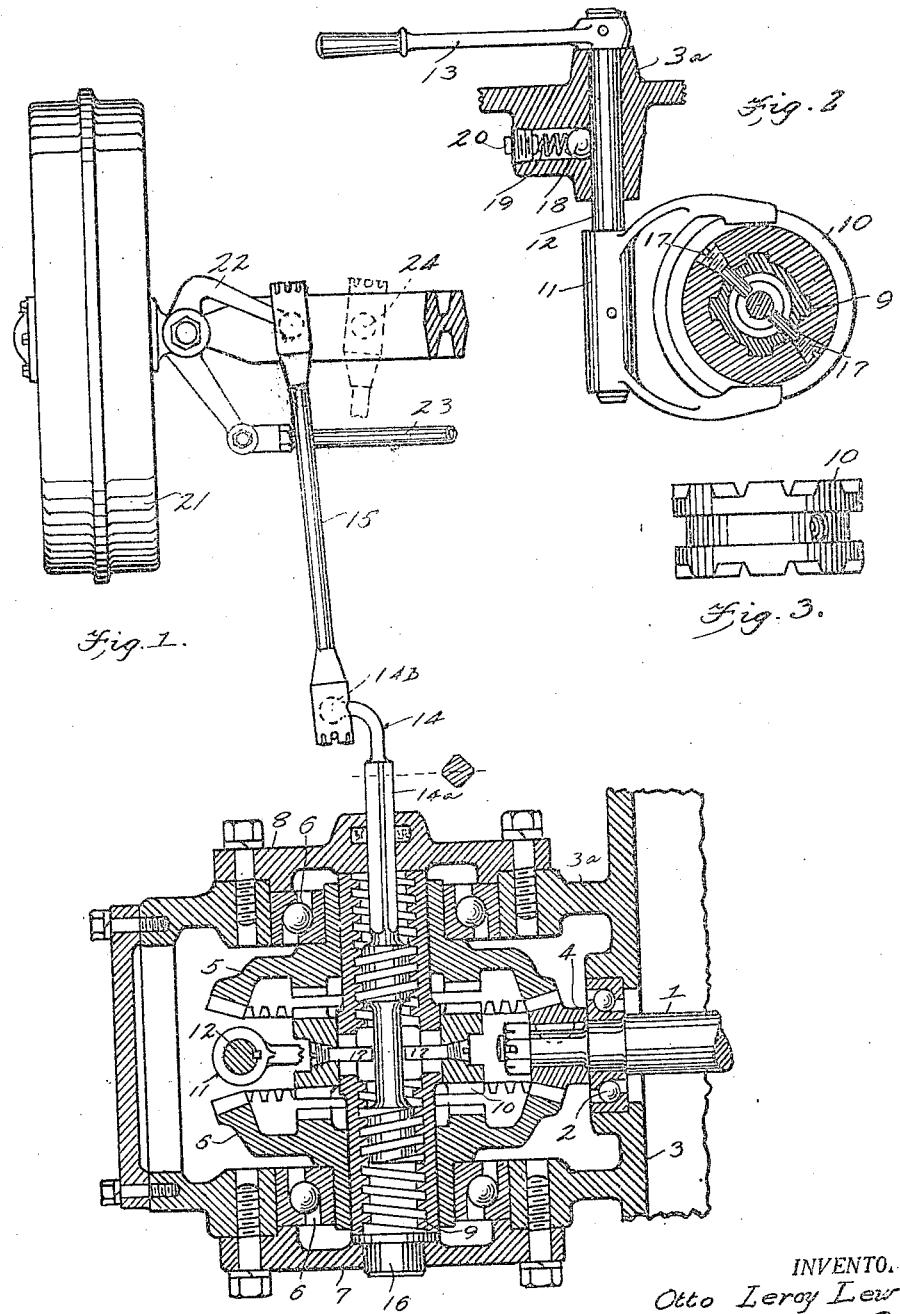

OTTO LEROY LEWIS, OF HOUSTON, TEXAS.

POWER-STEERING DEVICE FOR TRACTORS.

1,394,682.  Specification of Letters Patent.  Patented Oct. 25, 1921.

Application filed November 12, 1920. Serial No. 423,621.

*To all whom it may concern:*

Be it known that I, OTTO LEROY LEWIS, a citizen of the United States, and a resident of Houston, in the county of Harris and State of Texas, have invented certain new and useful Improvements in Power Steering Devices for Tractors, of which the following is a specification.

My present invention relates to steering devices for tractors which are steered by partially rotating the front axle about a centrally located pivot as well as those which are steered by swinging the wheel about a pivot pin or steering knuckle at each end of a stationary axle, and the object of the invention is to dispense with the actual labor involved in the manual manipulation of the ordinary steering arrangement, which manual manipulation, particularly in a large heavy tractor and upon broken uneven ground is quite laborious and fatiguing to the operator.

A further object is the provision of a steering device which may be controlled by means of flexible lines or reins from the operator's station either on the tractor itself or upon a trailing vehicle drawn thereby, and I preferably attain these objects by the means and mechanism illustrated in the accompanying drawing which forms a part of this specification, and in which, Figure 1 is a plan view, partly in horizontal section, of the mechanism proposed by my invention, Fig. 2 is a vertical transverse section taken partially therethrough along a central line through the controlling clutch and manipulating means, and Fig. 3 is a detail plan view of the clutch member or collar removed.

Referring now to these figures and particularly to Fig. 1, I have shown a driven shaft 1 which extends from and may be a part of the transmission of the tractor and which extends outwardly through and has a bearing 2 adjacent to its outer end within a portion 3 of one side of the transmission case.

Keyed or otherwise fastened and locked upon the outer end of the shaft 1 is a bevel pinion 4 uniformly in mesh with and driving a pair of spaced bevel gears 5 which latter, engaging as they do opposite sides of the pinion 4, are caused to rotate in opposite directions. These two bevel gears 5 have sleeve portions disposed in bearings 6 which take up the thrust and radial strain and which are disposed in the apertured front and rear portions of a steering gear housing 3ª extending from the transmission case 3. The bearings 6 are retained by bearing caps 7 and 8 bolted to the steering gear housing around its openings to exclude dust and dirt.

The bevel gears 5 whose outer toothed surfaces are engaged by the pinion 4, rotate upon the end portions of a sleeve 9 which has a free running fit in the gears and has a central surface portion between the gears on which a clutch collar 10 is splined. The opposite ends of this clutch collar 10 are provided with clutch teeth as clearly shown in Fig. 3, which are engageable with similar teeth of the inside toothed rings of gears 5 so that the collar 10, normally free of both of the gears 5, is shiftable into engagement with either thereof depending upon the direction in which it is desired that the sleeve 9 shall be rotated.

Clutch collar 10 is shifted in either direction by means of a shifter yoke 11 secured upon the lower end of an upright shaft 12 which may be manipulated by a hand lever 13 secured upon its upper end, or by means of a double end lever with reins or lines attached to the ends thereof.

The sleeve 9 as seen in Fig. 1 is internally threaded to take the threaded portions of an axially shiftable shaft 14 whose forward portion is of polygonal shape and is mounted to slide through a conformably shaped opening axially of the forward bearing cap 8 whereby the shaft is prevented from rotation. The forward extremity of this axially shiftable shaft has an angularly disposed ball end 14ᵇ to fit the rear socket of a drag link 15, which latter may be of standard construction, and axial movement or thrust of sleeve 9 is taken up by the end cap 8 and by a plug 16 firmly secured in the rear bearing cap 7.

Between its threaded portions, the shaft 14 is reduced as shown, and stop pins 17 are securely fastened in the clutch collar and project inwardly adjacent to the reduced portion of the shaft through slots of sleeve 9, they being thus positioned between the shoulders at the ends of the reduced central portion of the shaft to coöperate with the latter in limiting axial movement of the shaft.

In operation, pinion 4 drives the gears 5 in opposite directions and in a continuous manner while the tractor is in operation. By shifting clutch collar 10 into engagement with either of the gears 5 rotation is thus imparted by the respective gear to the clutch collar and, through the latter to the sleeve whose threaded engagement with the shaft 14 imparts axial shifting movement to the latter in a direction dependent upon which of the gears 5 have been clutched and by virtue of the fact that the shaft is held against rotation.

In this operation the relation between the direction of rotation of the clutch collar and the direction of shifting movement of the shaft is such that when the shaft has shifted the greatest distance it is desired to have the same shift, one of its shoulders will engage the stop pins 17 and automatically shift the clutch collar out of engaged position so as to thereby prevent breakage should the operator attempt to turn in too short a radius.

The clutch shifter yoke 11 is normally held in neutral position, with the clutch collar 10 disengaged, by means of a spring actuated retaining ball 18 seated in the upper portion of the steering gear housing 3ᵃ and engageable with a concave seat in the shaft 12 under tension of a spring 19 which is held in place by a plug 20 as shown in Fig. 2.

In Fig. 1 I have shown one of the steering wheels 21 of a tractor, shiftable for steering purposes on a steering knuckle having an arm 22 with which the forward end of the drag link has a ball and socket connection. The steering knuckle is also shown with another arm pivotally connecting with the adjacent end of the tie rod 23 whereby the two front wheels are shifted in unison. This latter construction is standard automobile construction and it is quite obvious that my invention, constructed and operating as described, may be utilized in connection with tractors in which the entire front axle is swung for steering purposes around a central pivot. In the latter instance drag link 15 will be connected to a ball stud rigid with the axle as indicated in dotted lines at 24 in Fig. 1.

I claim:

1. In a power steering device for power propelled vehicles having steering wheels and steering wheel connections, an axially shiftable shaft having universally movable members uniting the same at one end with the steering wheel connections, a pair of spaced gears, a driven shaft, a pinion carried by the driven shaft and engaging said gears, a sleeve rotatably mounted through the gears and held against lengthwise movement, through which the axially shiftable shaft is threaded, means to prevent rotation of said axially shiftable shaft, a clutch member splined on the sleeve and having manual means for shifting the same toward and in engagement with the said spaced gears, and means to limit axially shifting movements of the said shaft in relatively opposite directions.

2. In a power steering device for power propelled vehicles having steering wheels and steering wheel connections, an axially shiftable shaft having universally movable members uniting the same at one end with the steering wheel connections, a pair of spaced gears, a driven shaft, a pinion carried by the driven shaft and engaging said gears, a sleeve rotatably mounted through the gears and held against lengthwise movement, through which the axially shiftable shaft is threaded, means to prevent rotation of said axially shiftable shaft, a clutch member splined on the sleeve and having manual means for shifting the same toward and in engagement with the said spaced gears, and means to limit axially shifting movements of the said shaft in relatively opposite directions, said last named means including members carried by the clutch collar and acting to shift the latter into disengaged position.

3. In a power steering device for power propelled vehicles having steering wheels and steering wheel connections, an axially shiftable shaft having universally movable members uniting the same at one end with the steering wheel connections, a pair of spaced gears, a driven shaft, a pinion carried by the driven shaft and engaging said gears, a sleeve rotatably mounted through the gears and held against lengthwise movement, through which the axially shiftable shaft is threaded, means to prevent rotation of said axially shiftable shaft, a clutch member splined on the sleeve and having manual means for shifting the same toward and in engagement with the said spaced gears, said shaft having a reduced portion and said clutch collar having pins projecting adjacent to the reduced portion of the shaft for the purpose described.

4. A power steering device for power driven vehicles having steering wheels, which consists of an axially shiftable member connected to the steering wheel and non-rotatably held, a rotatable member having a threaded connection with the first named member, a driven shaft, oppositely rotatable gears actuated by the driven shaft, clutch controlled means for imparting rotation from said gears to said rotatable member, and manual means for shifting said clutch controlled means.

5. A power steering device for power driven vehicles having steering wheels, which consists of an axially shiftable member connected to the steering wheel and non-rotatably held, a rotatable member having a threaded connection with the first named member, a driven shaft, oppositely rotatable gears actuated by the driven shaft, and a manually controlled clutch member shiftable on and rotatable with said rotatable member and having means to engage the said gears.

6. A power steering device for power driven vehicles having steering wheels, which consists of an axially shiftable member connected to the steering wheel and non-rotatably held, a rotatable member having a threaded connection with the first named member, a driven shaft, oppositely rotatable gears actuated by the driven shaft, and a manually controlled clutch member shiftable on and rotatable with said rotatable member and having means to engage the said gears, and means carried by said clutch member and said axially shiftable member whereby to release the former when the latter reaches its limit of movement in either direction.

OTTO LEROY LEWIS.